US006247649B1

United States Patent
Nada (10) Patent No.: US 6,247,649 B1
(45) Date of Patent: *Jun. 19, 2001

(54) CODE READER FOR REPRODUCING INFORMATION RECORDED AS CODE PATTERN

(75) Inventor: Yoshiyuki Nada, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,408

(22) Filed: Oct. 13, 1999

Related U.S. Application Data (63) Continuation of application No. 09/093,498, filed on Jun. 8, 1998, now Pat. No. 6,027,023.

(30) Foreign Application Priority Data

Jun. 18, 1997 (JP) .................................................. 9-161297

(51) Int. Cl.⁷ ....................................................... G06K 7/10
(52) U.S. Cl. ................................. 235/462.45; 235/462.46
(58) Field of Search ........................... 235/462.45, 462.46

(56) References Cited

U.S. PATENT DOCUMENTS

| 4,570,250 | 2/1986 | Gabritsos et al. . | |
|---|---|---|---|
| 5,180,564 | * 1/1993 | Shepard et al. | 235/472.01 |
| 5,315,097 | 5/1994 | Collins, Jr. et al. . | |

FOREIGN PATENT DOCUMENTS

| 0 670 555 A1 | 9/1995 | (EP) . |
|---|---|---|
| 5-266235 | 10/1993 | (JP) . |
| 6-231466 | 8/1994 | (JP) . |

* cited by examiner

Primary Examiner—Harold I. Pitts
(74) Attorney, Agent, or Firm—Frishauf, Holtz, Goodman, Langer & Chick, P.C.

(57) ABSTRACT

A code reader holder comprises an upper cover, a lower cover, a volume controller, an inner speaker, a electric element mounting portion, a substrate, a battery, and a terminal section. The electric element mounting portion decodes a code read by the code reader to convert the code into an electric audio signal, and outputs the electric audio signal as audio data from the inner speaker. The audio data is output at a suitable volume level adjusted by the volume controller. The code reader body contains therein an imaging section mainly comprising a lens and a light-receiving sensor as an imaging element, an illumination section for irradiating the code, and a transmission section for transmitting information obtained by the imaging element to the electric element mounting portion in the code reader holder.

4 Claims, 9 Drawing Sheets

CODE READER FOR REPRODUCING INFORMATION RECORDED AS CODE PATTERN

This is a division of application Ser. No. 09/093,498 filed Jun. 8, 1998, now U.S. Pat. No. 6,027,023.

BACKGROUND OF THE INVENTION

The present invention relates to a device for reproducing audio data stored in an optically readable code pattern which is printed on a medium to store at least containing audio data, by manually reading the optically readable code pattern.

Japanese Patent Application No. 6-231466 discloses; an example of such a code reader. The code reader uses an earphone as audio data output means.

Japanese Patent Application No. 5-266235 discloses a holder for holding or standing a code reader.

The earphone disclosed in the Japanese Patent Application No. 6-231466, however, cannot be easily used by an infant or a child. If the code reader is connected to a speaker, a user can listen the sound of the audio data without using an earphone. The connection operation is, however, troublesome for a user.

Further, the code reader contains therein all the components from an processor to a power source, and thus is heavy and is not preferable in view of operability.

On the other hand, the code reader holder of the Japanese Patent Application No. 5-266235 merely functions to receive or stand the code reader, and an audio data output section thus needs to output audio data. In addition, the code reader holder is not designed at all to prevent/suppress from dust adhering to a surface of a lens.

BRIEF SUMMARY OF THE INVENTION

The present invention has been developed in consideration of the above-mentioned problem, and intends to provide a code reader having good operability, not requiring any complicated operation, and capable of outputting reproduced audio data from a speaker.

Additional objects and advantages of the invention will be set forth in the description which follows, and in part will be obvious from the description, or may be learned by practice of the invention. The objects and advantages of the invention may be realized and obtained particularly pointed out in the appended claims.

BRIEF DESCRIPTION OF THE SEVERAL VIEWS OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. is a perspective view showing an entire outer view of the code reader according to the first embodiment of the present invention, wherein the code reader body id held by a code reader holder.

DETAILED DESCRIPTION OF THE INVENTION

The embodiments of the present invention will be described below with reference to the drawings.

At first, the first embodiment will be described below with reference to FIGS. 1–5.

Figure 1:
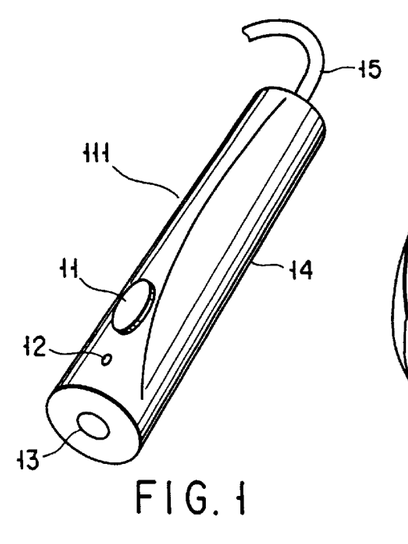
FIG. 1 is a perspective view of a code reader body of a code reader according to the first embodiment of the present invention.
Figure 2:
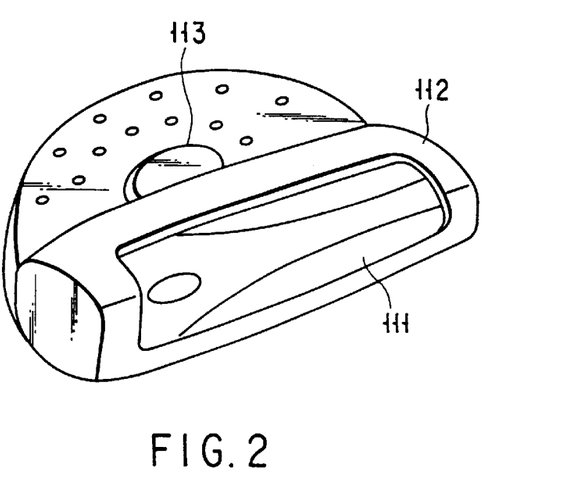

As shown in FIG. 1, a code reader body 111 comprises a body 14, an operation controller 11, a charging status indicator LED 12, and a code reading window 13. The code reader body 111 is connected to a code reader holder 112 shown in FIG. 2 by a cable 15.

The code reader body 111 has a pen-like shape. A user reads information by holding code reader body 111 on his/her own hand, directing the code reading window 13 to a code (not shown) printed on a sheet-like medium, such as a bar-code as a one-dimensional code or a dot-code as a two-dimensional code, and moving (manually scanning) the code reader body 111 while pressing the operation controller.

The charging status indicator LED 12 flashes or turned on/off in accordance with the reading result to inform the user of whether or not the reading is correctly performed. The charging status indicator LED 12 is also used to indicate the charging status of the code reader body 111 charged by the code reader holder 112, in addition to the indication of the reading result.

Figure 3:
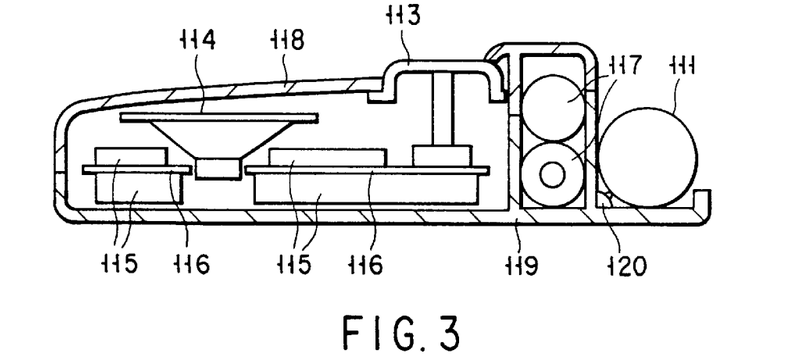
FIG. 3 is a sectional side view of the code reader holder in the code reader according to the first embodiment of the present invention.

The code reader holder 112, as shown in FIG. 3, comprises an upper cover 118, a lower cover 119, a volume controller 113, an inner speaker 114, a electric element mounting portion 115, a substrate 116, a battery 117, and a terminal section 120. The electric element mounting portion 115 decodes a code read by the code reader 111 to convert the code into an electric audio signal, and outputs the electric audio signal as audio data from the inner speaker 114. The audio data is output at a suitable volume level adjusted by the volume controller 113. In this embodiment, the battery 117 is employed as a power source, but the power source needs not to be necessarily the battery. As a power source, an AC power source may be also employed.

The code reader body 111 contains therein an imaging section mainly comprising a lens and a light-receiving sensor as an imaging element, an illumination section for irradiating the code, and a transmission section for transmitting information obtained by the imaging element to the electric element mounting portion 115 in the code reader holder 112, though they are not shown in the drawing. It can be arbitrarily determined which components in the data transmission system between the code reader body 111 and the code reader holder 112, for example, from a section for performing the photoelectric conversion of the audio code to a section for converting the electric signal into an audio signal, are arranged in the code reader. The arrangement is determined in consideration of the size, manufacturing cost, operability and the like, and the relationship therebetween. The information from the code reader body 111 is transmitted to the code reader holder 112 via the cable 15.

The means of the data transmission between the reader body 111 and the code reader holder 112 needs not necessarily be a cable. The data transmission between the code reader body 111 and the code reader holder 112 may be performed with use of a wireless communication device for performing communication using infrared rays or electric wave.

Figure 5:
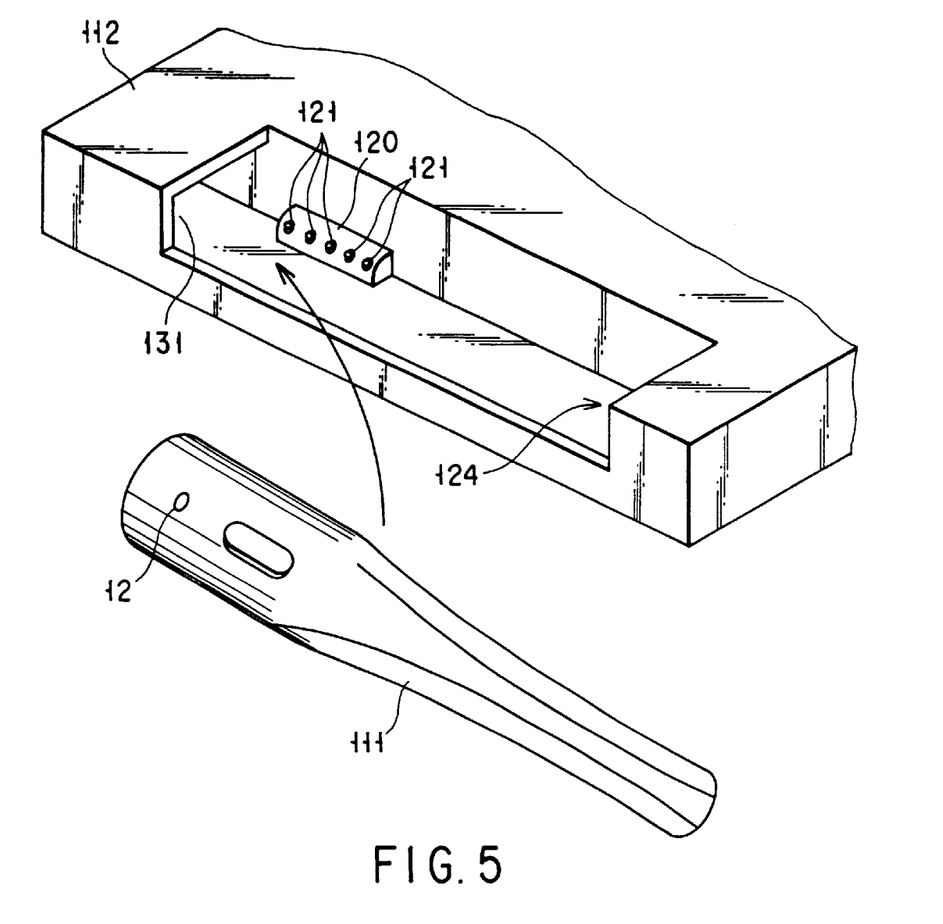
FIG. 5 is a perspective view of the code reader body showing that the code reader according to the first embodiment of the present invention is held by the code reader holder.

The code reader holder 112 has a connector 120 for electrically connecting the code reader holder 112 and the code reader body 111, as shown in FIG. 5. The connector 120 has a plurality of terminals 121 used to determine whether or not the code reader body 111 is correctly held by the code reader holder 112, and to supply an electric power to the code reader body 111 in order to charge the code reader body 111. The number of the terminals 121 is arbitrarily determined in accordance with the usage. Further, the code reader body 111 has the other terminals (not shown) of the corresponding number to that of the terminals 121 electrically contacting the terminals 121 at positions corresponding to the terminals 121 such that the terminals are covered with a cover lid or the like so that they are not exposed to the outside not in use, and exposed to the outside in putting the code reader body 111 into the cod reader holder 112.

After detecting that the code reader body 111 is correctly contained, the code reader holder 112 starts the charging of the code reader body. During the charging of the code reader body 111, it is indicated by the flashing of the charging status indicator LED 12, for example, that the code reader body 111 is being charged. When the charging has finished, it is also informed by the flashing of the charging status indicator LED 12, for example. The indication of the charging status may be performed in the other manner than the above-mentioned one. For another example of the indication, a user may employ an element capable of emitting two colors of light as the charging status indicator LED 12 to emit one color light beam during the charging, and when the charging has finished, to emit another color light.

Figure 4:
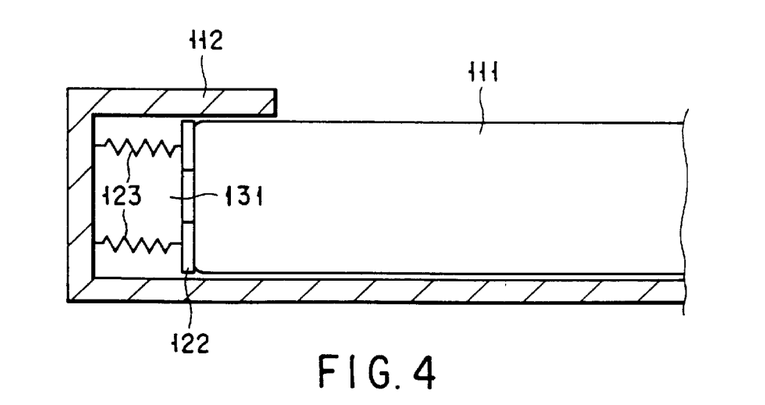
FIG. 4 is a sectional view showing an inner structure of a chamber in the code reader holder of the code reader according to the first embodiment of the present invention.

The putting operation of the code reader body 111 into the code reader holder 112 is performed by inserting the code reader body 111 at the side of the code reading window 13 into the chamber 131 of the code reader holder 112. As shown in FIG. 4, the chamber 131 has a receiving plate 122 provided movably in the direction of inserting of the code reader body 111, and a spring 123 for urging the receiving plate 122 toward an opposite wall 124.

The putting operation of the code reader body 111 is performed in the following manner: the code reader body 111 at the side of the code reading window 13 is put into the chamber 131 against an elastic force of the spring 123, then the other side of the code reader body 111 is put into the code reader holder 112. The code reader body 111 put into the code reader holder 112 in this manner is pushed toward the wall 124 opposite to the chamber 131 by the receiving plate 122 due to the recovering force the spring 123 so as to be pushed by both the receiving plate 122 and the wall 124. By being pushed in this manner, the code reader body is arranged at a predetermined position. In this state, the terminals 121 of the connector 120 of the code reader holder 112 are brought into contact with the terminals of the code reader body 111, thereby the charging of the code reader body 111 starts, in the above-described manner.

Figure 22:
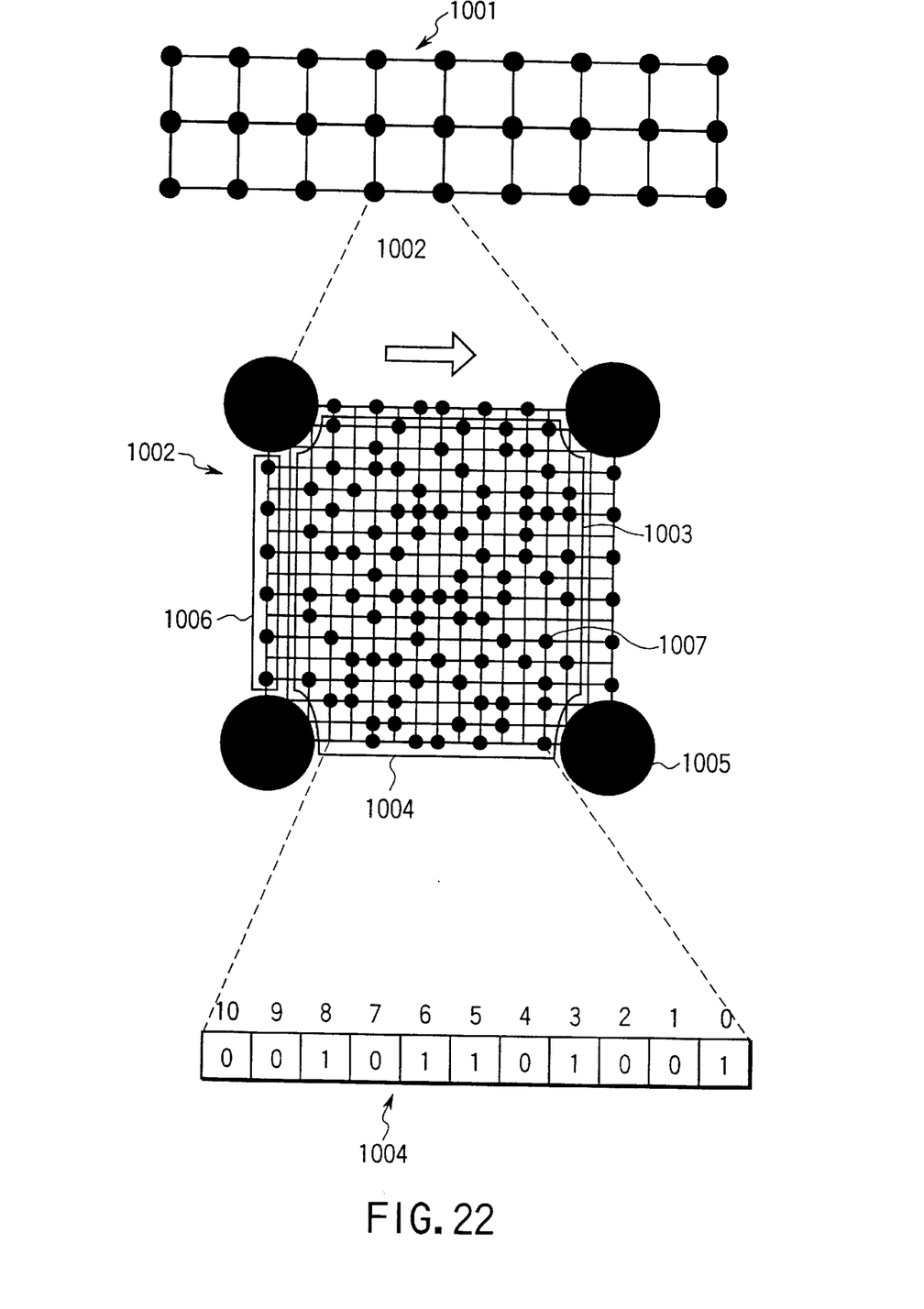
FIG. 22 shows a physical format structure of a dot code read by the code reader according to the present invention.

The code pattern read by the code reader of the present invention will be specifically described below. As shown in FIG. 22, a code pattern such as a dot code 1001 is constituted of a plurality of blocks 1002 two-dimensionally arranged to neighbor on each other. Each block 1002 comprises data areas 1003 in which each of audio data divided into the blocks exists as dot images 1007 in which white dots or black dots (the white dots have the same color as that background, and are not shown in the drawing), arranged in a predetermined array so as to respectively correspond to "0" or "1"; markers 1005 constituted of a predetermined number of black dots, which are arranged at four corners of each of the blocks 1002 to find a reference point for detecting each of the dot images 1007 in the data area 1003;

a matching dot pattern 1006 in an area between by the markers 1005; and a block address pattern 1004 arranged between the markers 1005, which includes an error detection or error correction code to discriminate the blocks 1002 in reading the code pattern.

Figure 20:
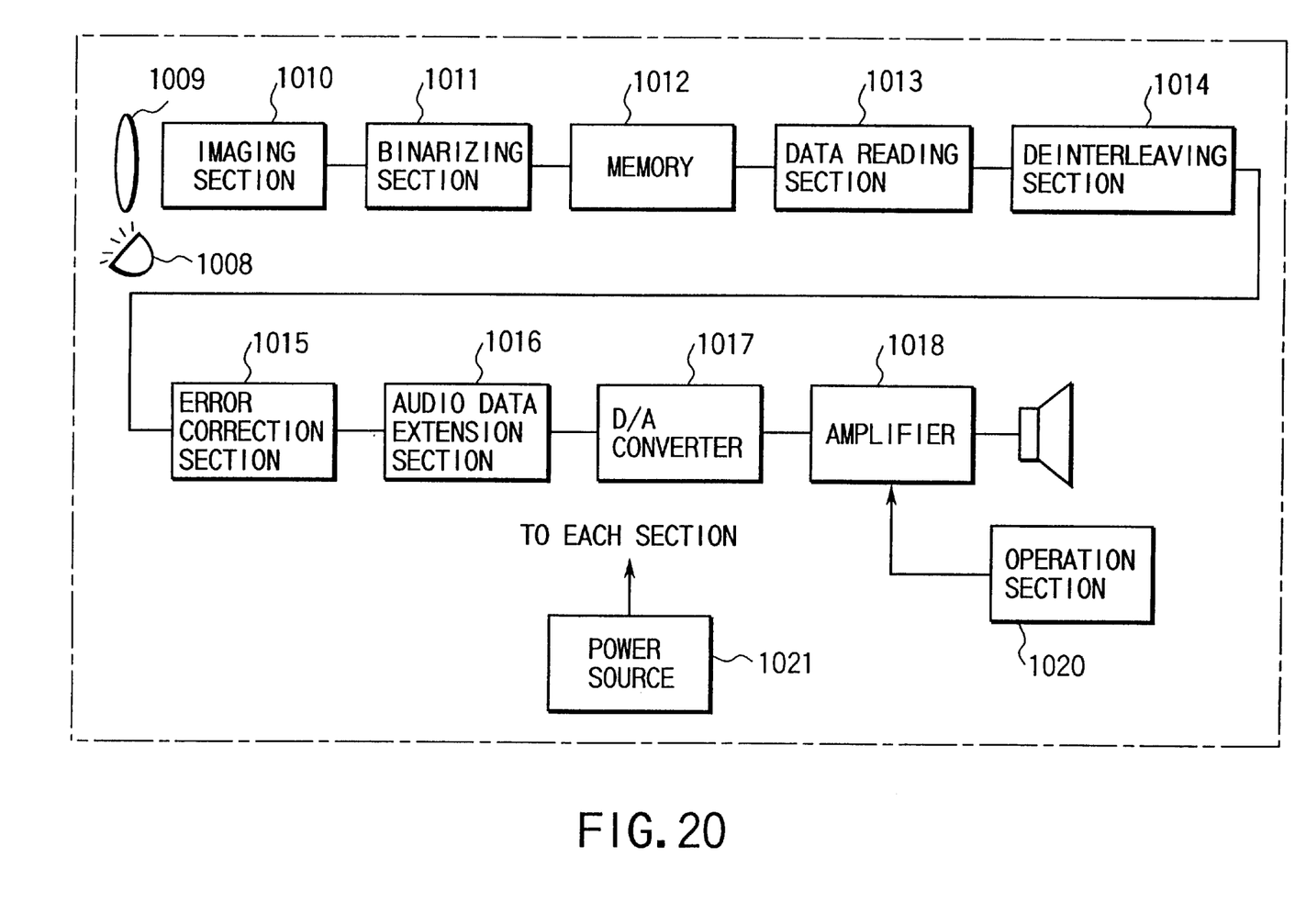
FIG. 20 is a functional diagram of the code reader wherein the code reader body and the code reader holder are connected by a cord.

FIG. 20 shows a function block diagram of the code reader, which shows that the code reader body is connected to and the code reader holder by the cable. As shown in FIG. 20, the code reader comprises an illumination 1008 of irradiating the code pattern; a lens 1009 for imaging the code pattern; an imaging section 1010 for photoelectrically converting the image converged by the lens into an electric signal by using a solid-state imaging element such as a CCD; a binarizing section 1011 for binarizing the data obtained by the imaging section 1010 on the basis of a predetermined level; a memory 1012 for temporarily storing the binarized image; a data reading section 1013 for reading the image data stored in the memory 1012 in a form of "0" or "1" corresponding to white dots or black dots; a deinterleaving section 1014 for recovering the arrangement of the image data, which is changed in preparing the code pattern, so that a burst error which may be contained in the data can be corrected; an error correction section 1015 for correcting reading errors in reproducing the data or data error; an audio data extension section 1016 for extending compressed data output from the error correction section 1015; a D/A converter 1017 for converting the output signal output from the audio data extension section 1016 into an analogue signal; an amplifier 1018 for amplifying the analogue audio signal output from the D/A converter 1017; a speaker 1019 for reproducing the amplified audio signal; and an operation section 1020 for adjusting the volume of the reproduced audio data.

The above-mentioned components may be arranged in such a manner that the code reader body may contain the illumination 1008, the lens 1009, and the imaging section 1010 and the code reader holder may contain the other components in order to reduce the code reader body in weight to improve the operability of the code reader, or the components 1010–1017 may be contained in the code reader body to reduce the number of the cables connecting the code reader body and the code reader holder to improve the reliability of the connection. In other words, it is determined in consideration of the operability, reliability, and manufacturing cost of the apparatus which of or how many components as mentioned above are contained in the code reader body. The power source 1021 of supplying power to each section is preferably arranged in the code reader holder in order to reduce the code reader body in size and weight.

Figure 21:
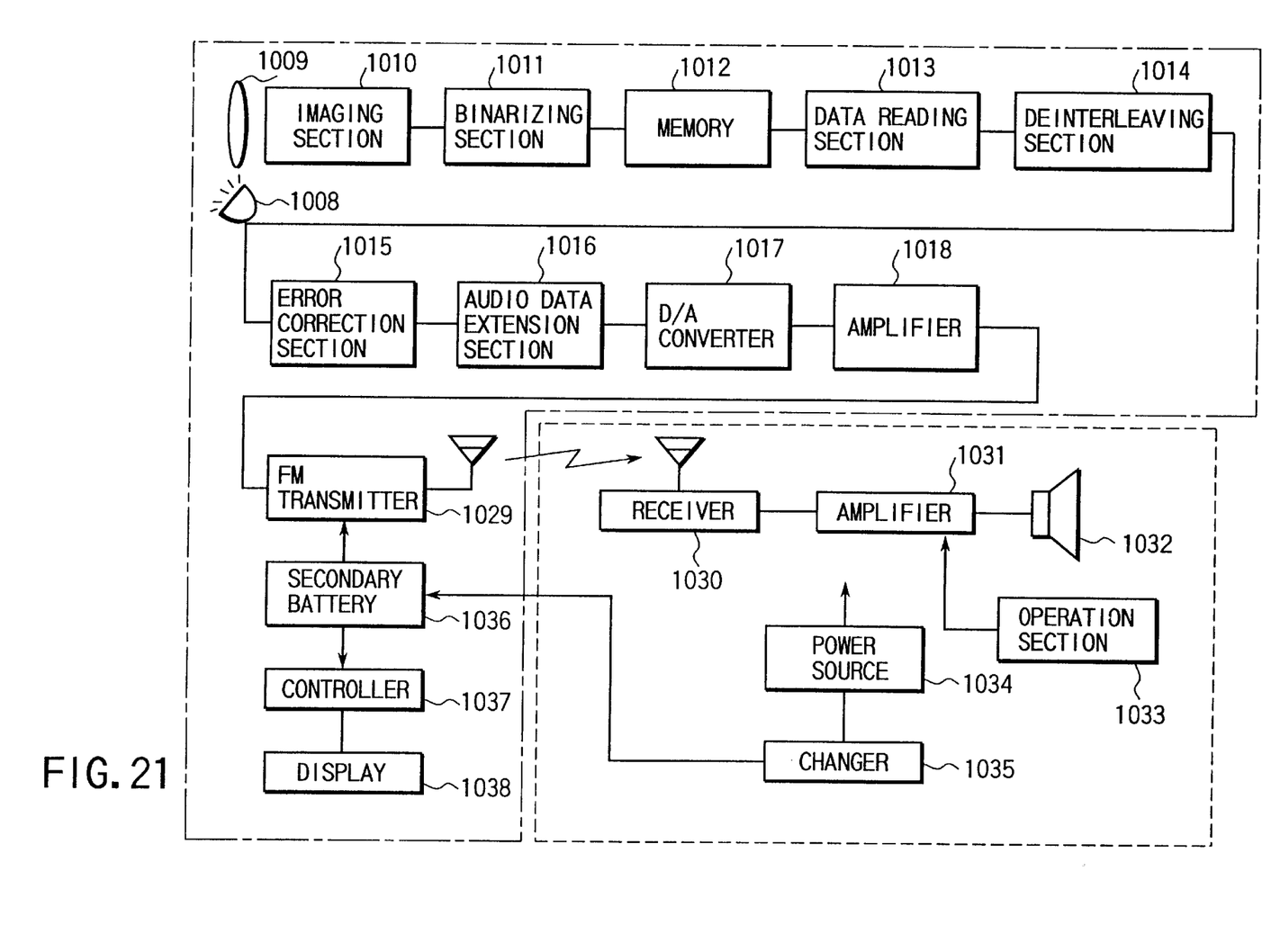
FIG. 21 is a functional diagram showing that the code reader body and the code reader holder are formed as cordless devices.

FIG. 21 is a functional block diagram of a code reader comprising a code reader body and the code reader holder which are respectively formed as cordless devices. The basic structure of the code reader is similar to that shown in FIG. 20, and thus the similar elements are denoted by the same reference numerals and the description thereof are omitted to avoid the redundancy. The audio signal read by the code reader body is transmitted to the code reader holder by an FM transmitter 1029 with use of an electric wave. The transmission may be performed in the other method such as optical data transmission using infrared rays. A transmission section mainly comprising the FM transmitter 1029 may transmit the image itself obtained by the imaging section. In short, the transmission method can be arbitrarily selected. Accordingly, the transmission section may be arranged in any position. The audio signal transmitted with use of FM wave is received by a receiver 1030, amplified by an amplifier 1031, and then output from the speaker 1032.

In the code reader shown in FIG. 21, the components in an area surrounded by a one-dot line are contained in the code reader body, and the components surrounded by a broken line are contained in the code reader holder. In the code reader shown in FIG. 21, the code reader holder has a power source 1034, and the code reader body has a secondary battery 1036. The secondary battery 1036 in the code reader body is charged by the charger 1035 contained in the code reader holder through the terminals 121 of the connector section 120 shown in FIG. 5 while the code reader body is contained in the code reader holder. As described above, the charging state of the secondary battery 1036 is indicated by a display 1038 (for example, the charging status indicator LED 12 shown in FIG. 1), which informs the user of the charging state, in particular, the finish of the charging. A controller 1037 may control the charger 1035 to control the charging state of the secondary battery 1036. To perform the charging control, a control signal is transmitted between the code reader body and the code reader holder via the terminals 121 of the connector 120 shown in FIG. 5. The controller 1037 may be arranged in the code reader holder to perform the above-mentioned control.

Next, a second embodiment of the present invention will be described below with reference to FIGS. 6–9.

Figure 6:
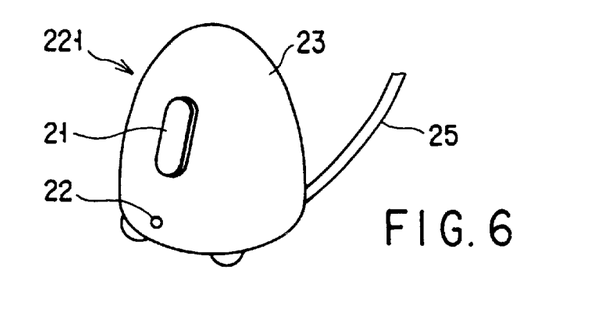
FIG. 6 is a perspective view of a code reader body of a code reader according to the second embodiment of the present invention.
Figure 7:
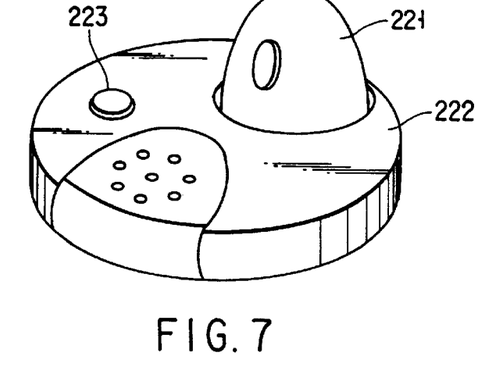
FIG. 7 is an entire outer view of the code reader according to the second embodiment of the present invention, wherein the code reader body is held by a code reader holder.

As shown in FIG. 6, a code reader body 221 comprises a body 23, an operation controller 21, and a charging status indicator LED 22. The code reader body 221 is connected to a code reader holder 222 having a volume controller 223 shown in FIG. 7 by a cable 25.

Figure 8:
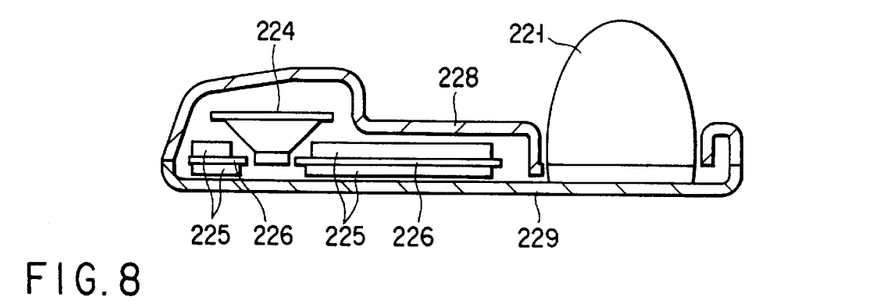
FIG. 8 is a sectional side view of the code reader holder of the code reader according to the second embodiment of the present invention.
Figure 9:
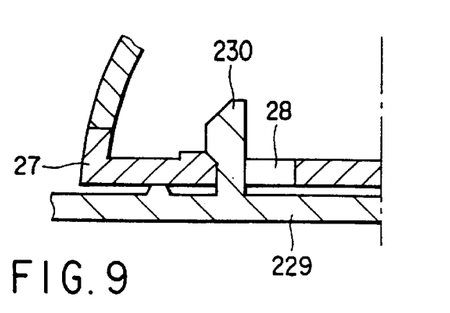
FIG. 9 sectional view showing a coupling state between the code reader body and the code reader holder of the code reader according to the second embodiment of the present invention.

The code reader holder 222 comprises a speaker 224, a electric element mounting portion 225, a substrate 226, an upper cover 228, and a lower cover 229, as shown in FIG. 8. FIG. 9 shows that the lower cover 229 has a craw 230 coupling with the code reader body 221. The craw 230 is inserted into a hole 28 formed in the lower cover 27 of the code reader body 221 when the code reader body 221 is disposed at a predetermined position in the code reader holder 222, and elastically change its own shape to hold the code reader body 221.

Figure 10:
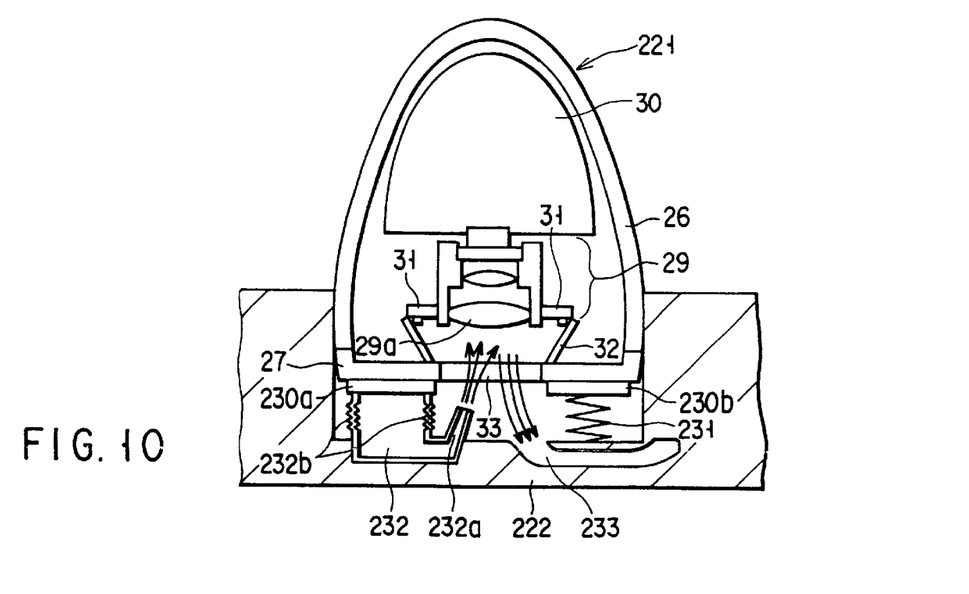
FIG. 10 is a view for explaining an air-blow type cleaning mechanism provided to the code reader holder of the code reader according to the second embodiment of the present invention.
Figure 11:
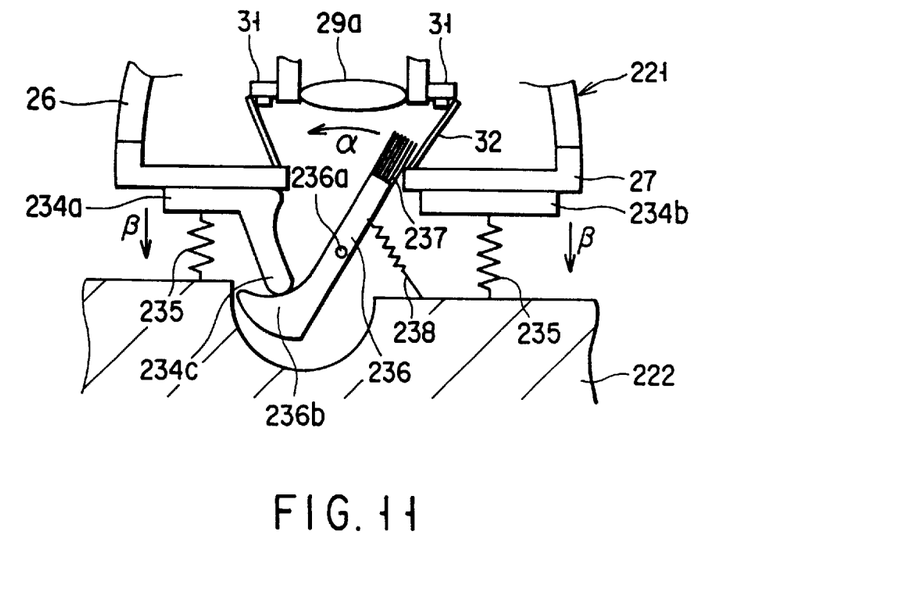
FIG. 11 is a sectional view for explaining a brush type cleaning mechanism provided to the code reader holder of the code reader according to the second embodiment of the present invention.
Figure 12:
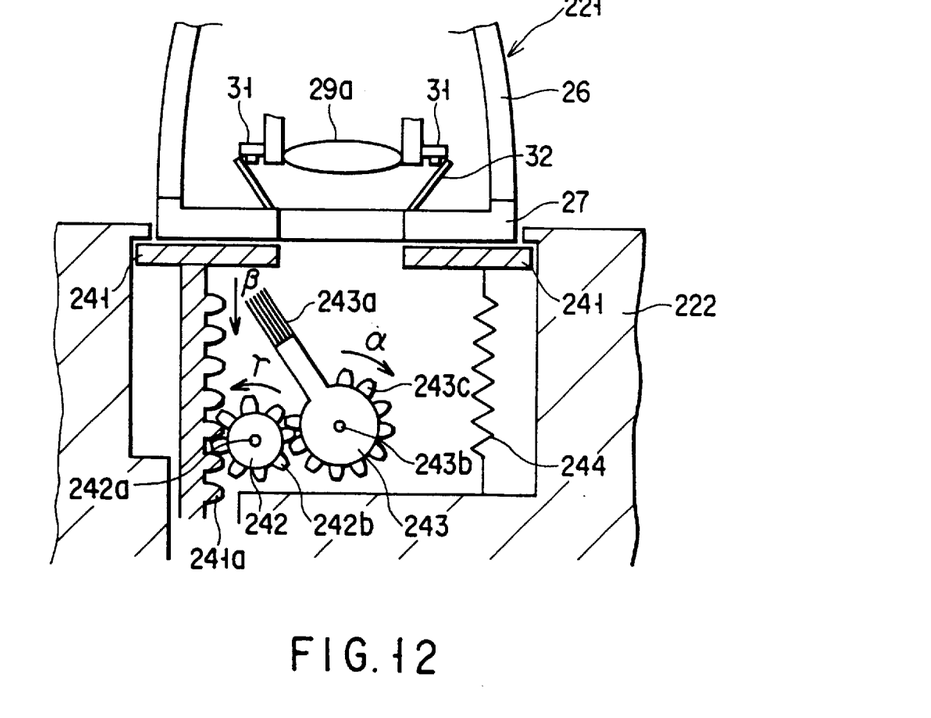
FIG. 12 is a sectional view for explaining another example of the brush type cleaning mechanism provided to the code reader holder of the code reader according to the second embodiment of the present invention.

The following is the description of a cleaning mechanism capable of being incorporated into the code reader holder 222 of the second embodiment, for cleaning a reading section of the code reader body 221, with reference to FIGS. 10–12. The cleaning mechanism shown in FIG. 10 is classified as an air-blow type, and the cleaning mechanisms shown in FIGS. 11 and 12 are both classified as a brush type. These cleaning mechanisms can be employed also in the code reader holder of the first embodiment.

The air-blow type cleaning mechanism will be described first with respect to FIG. 10. As shown in FIG. 10, the code reader body 221 comprises an upper cover 26, a lower cover 27, an optical reading section 29 including a lens 29a, a frame, and an imaging element, an electric element mounting portion 30, an illumination section 31 for irradiating a code to be read, a reflection plate 32 for collecting illumination light, and a code reading window 33.

The code reader holder 222 comprises receiving plates 230a and 230b for receiving the code reader body 221, a spring 231, a blower 232, an exhaust port 233. The exhaust port 233 extends in a direction orthogonal to a surface of a code to be read toward the outside.

The code reader body 221 is put into the code reader holder 222 by mounting the code reader body 221 on the receiving plates 230a and 230b, and pushing the code reader body 221 till the craw 230 is inserted in the hole 28 of the lower cover 27 of the code reader body 221, as shown in FIG. 9. The blower 232 has an accordion-folded member 232b which can elastically changes its own shape and is stretched/shrunk at the time of attaching/detaching of the code reader body 221. The blower 232 sucks/discharges air in accordance with the stretching/shrinking of the accordion-folded member 232b.

The accordion-folded member 232b of the blower 232 is compressed by pushing the code reader body 221 into the code reader holder, thereby the blower 232 discharges air toward the lens 29a of the optical reading section 23 to clean the lens 29a. The air discharged toward the lens 29a is exhausted with dust and dirt to the outside of the apparatus through the exhaust port 233, without delay.

As described above, the lens 29a of the optical reading section 29 is blown by air to be cleaned everytime when the code reader body 221 is put into the code reader holder 222.

Next, the brush type cleaning mechanism will be described below with reference to FIG. 11.

As shown in FIG. 11, the code reader holder 222 has receiving plates 234a and 234b for the code reader body 221, a spring 235, a brush lever 236 having a brush. The receiving plates 234a and 234b are provided movably in a direction in which the code reader body 221 is pushed, and the spring 235 urges the receiving plates 234a and 234b. The brush lever 236 having a brush is supported to be rotated with respect to an axis 236a and urged by the spring 238 in an opposite direction to an arrow α. The brush lever 236 is provided with a brush 237 at one end portion, and at another end portion, provided with a cum 236b. The receiving plate 234a has a protruding portion 234c which is brought into contact with the cum 236b of the brush lever 236 when the code reader body is pushed into the code reader holder.

When the code reader body 221 is put into the code reader holder, the receiving plates 234a and 234b are pushed in a direction of an arrow β. The protruding portion 234c of the receiving plate 234a pushes the cum 236b of the brush lever 236 down in accordance with the descending of the receiving plate 234a. Since the cum 236b is pushed down in this manner, the brush lever 236 is rotated in the direction of the arrow α with respect to the axis 236a, and the brush 237 provided to the end of the brush lever 236 cleans the lens 29a of the optical reading section. The brush 237 is designed to have a length which allows the brush to contact the lens 29a under an uniform pressure while the brush lever 236 is rotated.

In this manner, the lens 29a of the optical reading section is cleaned by the brush 237 everytime when the code reader body 221 is put into the code reader holder 222.

Subsequently, another example of the brush type cleaning mechanism will be described below with respect to FIG. 12.

As shown in FIG. 12, the receiving plate 241 is urged by the spring 244 in the opposite direction of the arrow β and provided with a rack gear 241a. A gear 242 geared with the rack gear 241a is supported by the code reader holder 222 rotatably with respect to an axis 242a. The brush gear 243 having a gear 243c geared with the gear 242 is supported by the code reader holder 222 rotatably with respect to the 243b. The brush gear 243 has brush 243a for cleaning the lens 29a of the optical reading section of the code reader body 221.

When the code reader body 221 is put into the code reader holder 222, the receiving plate 241 is pushed in the direction of the arrow β. The rack gear 241a is moved in the direction of the arrow β in accordance therewith, which rotates the gear 242 geared with the rack gear 241a in a direction of an arrow γ. The rotation of the gear 242 in the direction of the arrow γ rotates the brush gear 243 with a brush in the direction of the arrow α. By virtue of the rotations as described above, the brush 243a cleans the lens 29a of the code reader body 221.

In the above-mentioned cleaning mechanism, the brush 243a is positioned inside of the receiving plate 241 when the code reader body 221 is not put in the code reader holder 222. By arranging the brush 243a, a user will be prevented from unintentionally contacting the brush 243a. The brush 243a made dirty by grease of a hand of a user will not clean the lens 29a but make the lens 29a dirty in the cleaning of the lens 29a, in contrary.

With such a cleaning mechanism, the brush 243a cannot be easily made dirty by an unintentional contact by a user, to maintain the good cleaning ability of the brush 243a for a long time.

In this manner, everytime when the code reader body 221 is put into the code reader holder 222, the lens 29a of the optical reading section is cleaned by the brush 243a, and the cleaning function of the brush can be maintained for a long time in a good condition.

The cleaning mechanisms described above are all intended to clean the lens 29a of the optical reading section 29 in accordance with the putting operation of the code reader body 221 into the code reader holder 222. The apparatus may be provided with an actuator and an switch for the cleaning operation to allow a user to arbitrarily perform the cleaning at a desired time.

A third embodiment of the present invention will be described below with reference to FIGS. 13–16. The code reader body of the present embodiment has a suitable shape to be held both in a pen-grip style and a hand-grip style.

Figure 13:
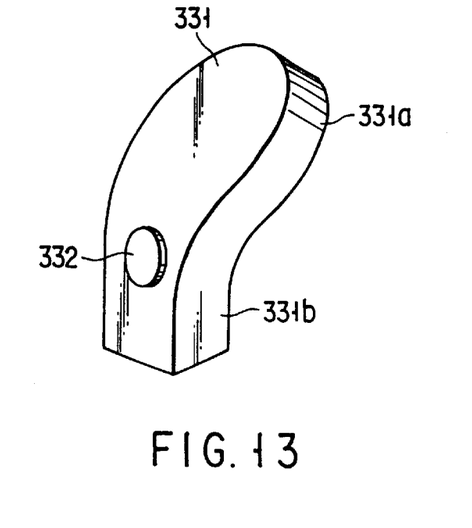
FIG. 13 is a perspective view of a code reader body of a code reader according to the third embodiment, of the present invention.

As shown in FIG. 13, a code reader body 331 has a large diameter section 331a and a small diameter section 331b. The large diameter section 331a is located near a code reading window, and the small diameter section 331b is located on the opposite side thereof. The portion from the large diameter section 331a to the small diameter section 331b is bent, and an operation controller 332 is located near the small diameter section 331b to be arranged outside of the bending direction.

Figure 14:
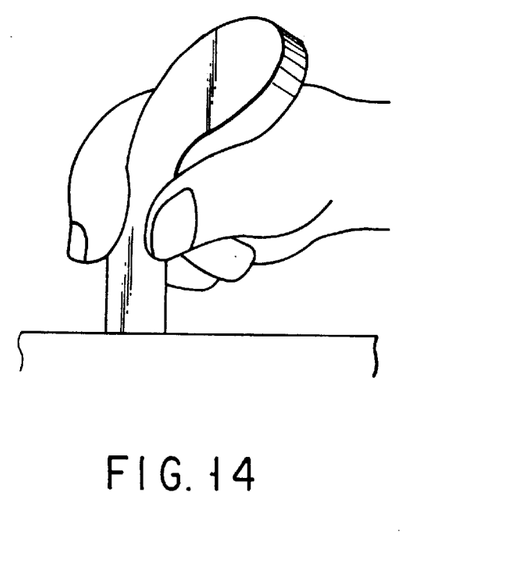
FIG. 14 is a view showing a using state of the code reader according to the second embodiment of the present invention, wherein the code reader body is held in a pen-grip style.
Figure 15:
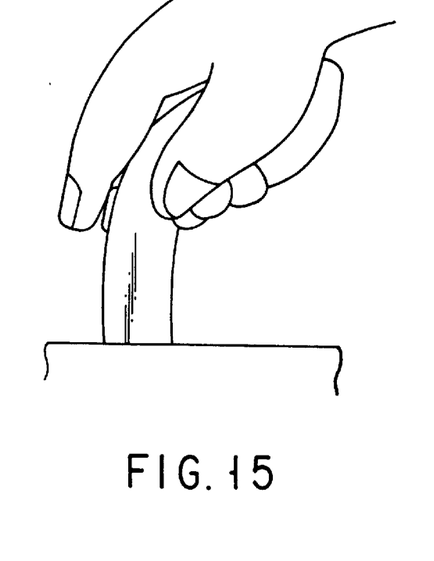
FIG. 15 is a view showing a using state of the code reader according to the second embodiment of the present invention, wherein the code reader body is held in a hand-grip style.

With such a feature in shape, a user can hold the code reader in the pen-grip style as shown in FIG. 14 o r in the hand-grip style as shown in FIG. 15.

Figure 16:
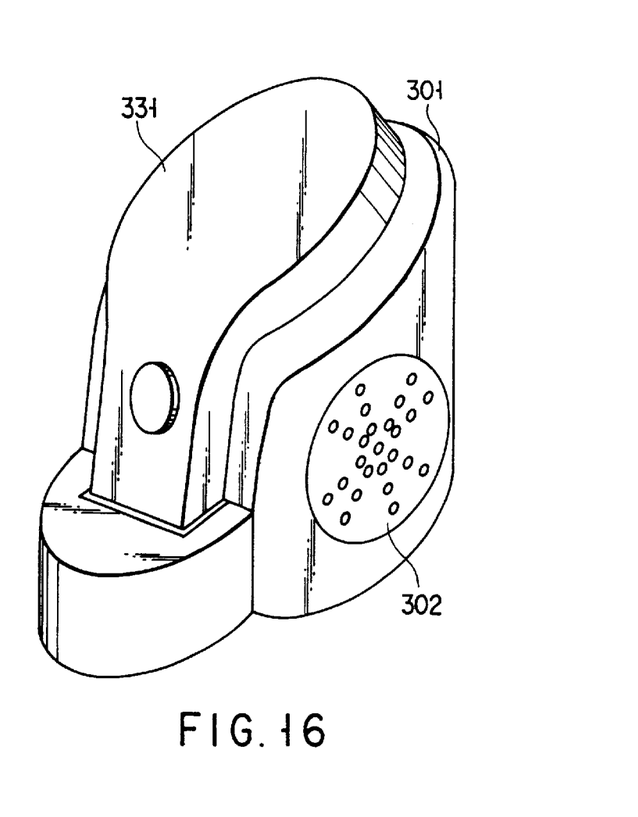
FIG. 16 is a perspective view of an entire outer view of the code reader according to the third embodiment of the present invention, wherein the code reader body is held by a code reader holder.

The code reader body 331 is put into a special code reader holder 301 shown in FIG. 16. Similarly to the above-mentioned embodiment, the code reader holder 301 has a function of reproducing information read by the code reader body 331 as audio data with use of a speaker 302, and preferably has the cleaning mechanism as described before.

A fourth embodiment of the present invention will be described last with reference to FIGS. 17–19. The code reader body of the present embodiment has a shape enabling to easily maintain a stable posture with respect to a code pattern.

Figure 17:
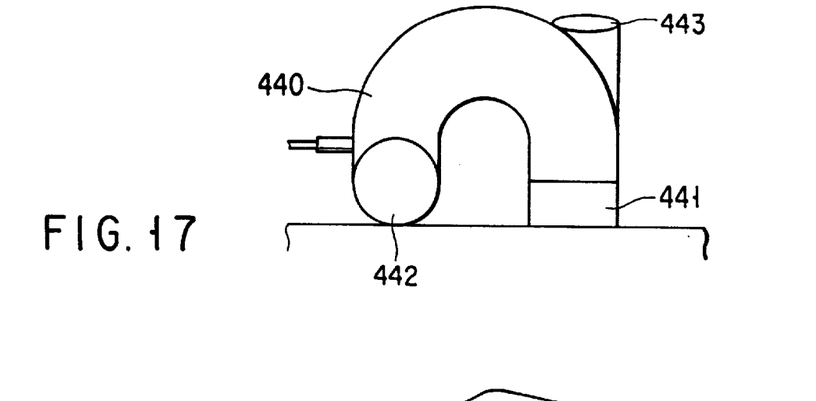
FIG. 17 is a side view of a code reader body of a code reader according to the fourth embodiment of the present invention.

As shown in FIG. 17, a code reader body 440 has a reverse U-shaped side shape and is provided at both ends with a first slidable contact portion 441 and a second slidable contact portion 442. At both of the contact portions, the code reader body contacts a sheet-like medium on which a code pattern to be read is printed. An operation controller 443 is arranged at an upper portion of the code reader body 440 to be located near the central portion of the code reader body 440. The first slidable contact portion 441 serves as a reading section, and the second slidable contact portion 442 is formed in a column-shape and thus has less resistance to the medium and can be substantially functions as a roller.

Figure 18:
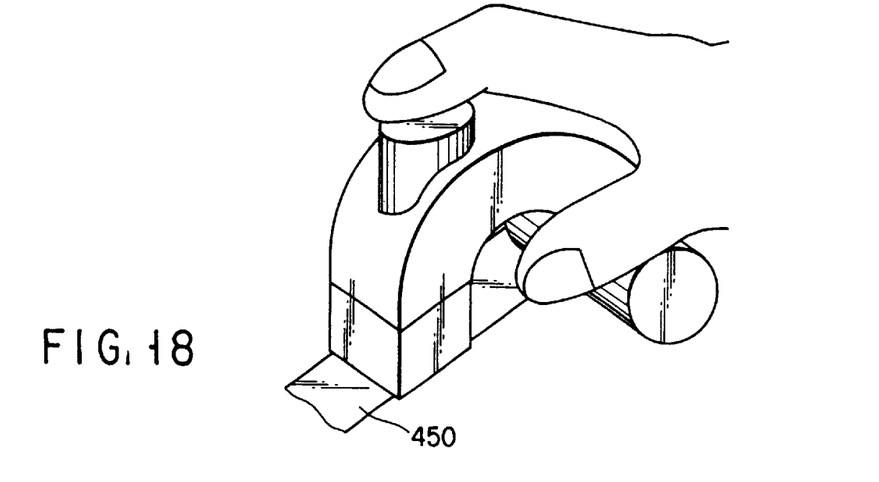
FIG. 18 is a view showing a using state of the code reader body according to the fourth embodiment of the present invention.

As shown in FIG. 18, the code reader body 440 is stably maintained at a predetermined posture with respect to the code pattern 450 by the two slidable contact portions 441 and 442 during the scanning. In addition, the reading section, i.e., the first slidably contact section 441 is secured to be surrounded by a space, and thus can be easily aligned with respect to the code pattern 450.

Figure 19:
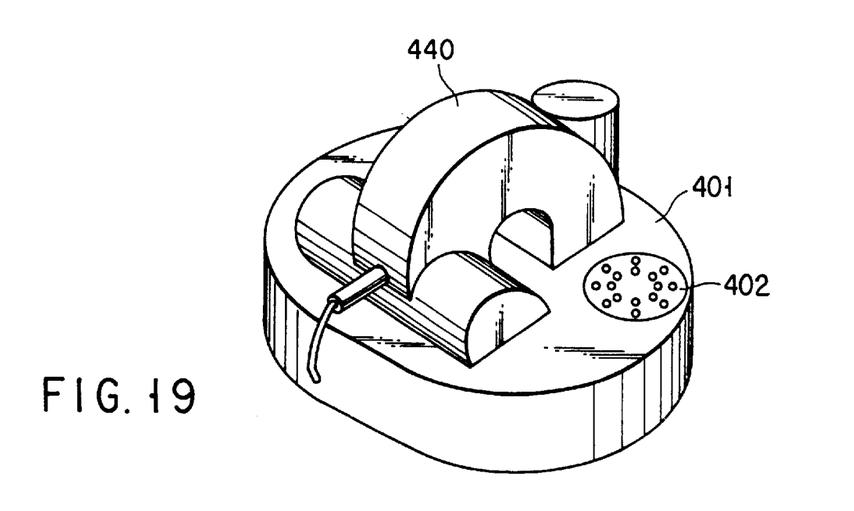
FIG. 19 is a perspective view showing an entire outer view of the code reader according to the fourth embodiment of the present invention, wherein the code reader body is held by a code reader holder.

The code reader body 440 reading the code pattern 450 is put into a special code reader holder 401 shown in FIG. 19, and the audio data corresponding to the code pattern 450 is reproduced with use of the speaker 402.

As is clear from the above-described descriptions of the present invention through some embodiments, the present invention can provide a code reader capable of reproducing audio data through a speaker without any complicated operation. Further, the code reader according to the present invention gives some of essential elements to a code reader holder to reduce the code reader body in weight, thereby realizes good operability.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code reader comprising:

a code reader body provided with an optical reading section that optically reads an optically readable code pattern printed on a sheet-like medium, which stores at least audio data, by manually scanning the code pattern; and a code reader holder including a chamber that receives at least the optical reading section of the code reader body in a manner such that easy access to the code reader body is provided, and a speaker that outputs the audio data by processing the code pattern read by the optical reading section;

wherein the code reader holder further includes a connector that electrically connects the code reader holder to the code reader body, and a charger that charges the code reader body after detecting through the connector that the code reader body is contained in the chamber.

2. A code reader according to claim 1, wherein the code reader holder further includes a power source for supplying electric power to the code reader body through the connector.

3. A code reader comprising:

a code reader body provided with an optical reading section that optically reads an optically readable code pattern printed on a sheet-like medium, which stores at least audio data, by manually scanning the code pattern; and a code reader holder including a chamber that receives at least the optical reading section of the code reader body in a manner such that easy access to the code reader body is provided, and a speaker that outputs the audio data by processing the code pattern read by the optical reading section;

wherein the code reader body further includes means for supplying an information signal corresponding to the code pattern read by the code reader body to the code reader holder in a wireless manner.

4. A code reader according to claim 1, wherein the code reader holder further includes a volume controller for controlling a volume level of the audio data output from the speaker.

* * * * *